(12) United States Patent
Zimmer

(10) Patent No.: US 7,503,094 B2
(45) Date of Patent: Mar. 17, 2009

(54) WINDSCREEN WIPER DEVICE

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 823 days.

(21) Appl. No.: 10/504,476

(22) PCT Filed: Dec. 3, 2003

(86) PCT No.: PCT/DE03/03978

§ 371 (c)(1),
(2), (4) Date: Aug. 12, 2004

(87) PCT Pub. No.: WO2004/071825

PCT Pub. Date: Aug. 26, 2004

(65) Prior Publication Data

US 2006/0016039 A1    Jan. 26, 2006

(30) Foreign Application Priority Data

Feb. 13, 2003  (DE)  ................. 103 05 857

(51) Int. Cl.
*B60S 1/06* (2006.01)
*B60S 1/16* (2006.01)

(52) U.S. Cl. ............... 15/250.3; 15/250.001; 15/250.06

(58) Field of Classification Search ................. 15/250.3, 15/250.001, 250.002, 250.06
See application file for complete search history.

(56) References Cited

U.S. PATENT DOCUMENTS

| | | | | | |
|---|---|---|---|---|---|
| 3,633,238 | A | * | 1/1972 | Parker | ........................ 15/250.21 |
| 5,275,249 | A | * | 1/1994 | Nelson | ........................ 180/69.2 |
| 5,381,582 | A | * | 1/1995 | Lee et al. | ................. 15/250.19 |
| 5,504,966 | A | * | 4/1996 | Lee et al. | ................. 15/250.19 |
| 6,193,304 | B1 | * | 2/2001 | Takahashi et al. | ........... 296/192 |
| 2006/0016039 | A1 | * | 1/2006 | Zimmer | ..................... 15/250.3 |

FOREIGN PATENT DOCUMENTS

| | | |
|---|---|---|
| DE | 108 43 042 A1 | 3/2000 |
| DE | 100 21 142 A1 | 10/2001 |
| DE | 101 28 967 C1 | 12/2002 |

* cited by examiner

*Primary Examiner*—Lee D Wilson
(74) *Attorney, Agent, or Firm*—Michael Best & Friedrich LLP

(57) ABSTRACT

Windshield wiper device, in particular for a motor vehicle, with at least one wiper arm (11) and an engine hood (12) that can be raised in the case of an impact, wherein the at least one wiper arm (11) can be moved in the case of an impact into a position below a windshield (10) or into a position in the area of a wiper field.

18 Claims, 2 Drawing Sheets

Figure 3:
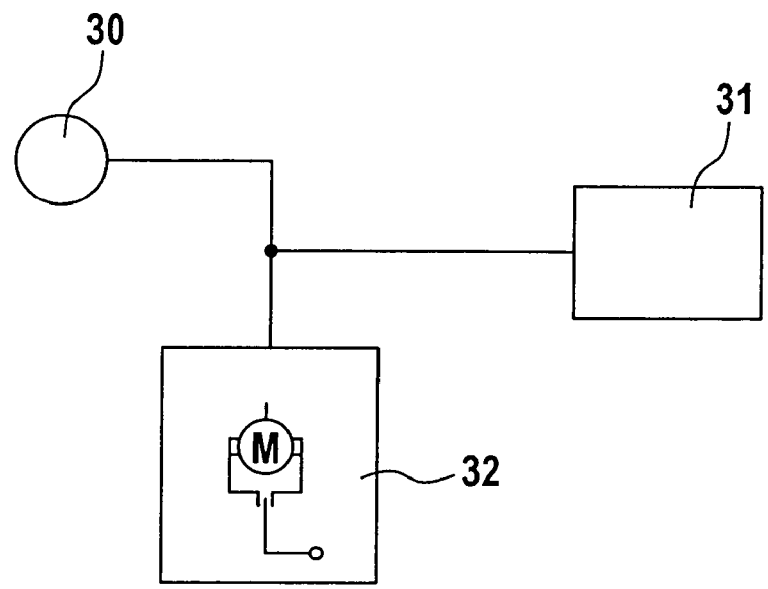

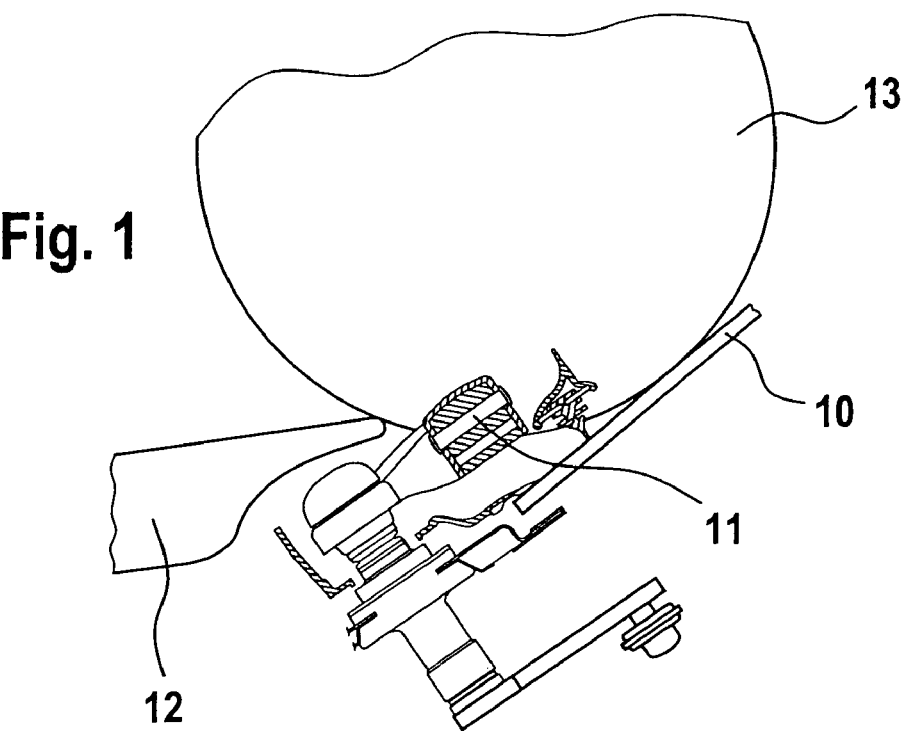
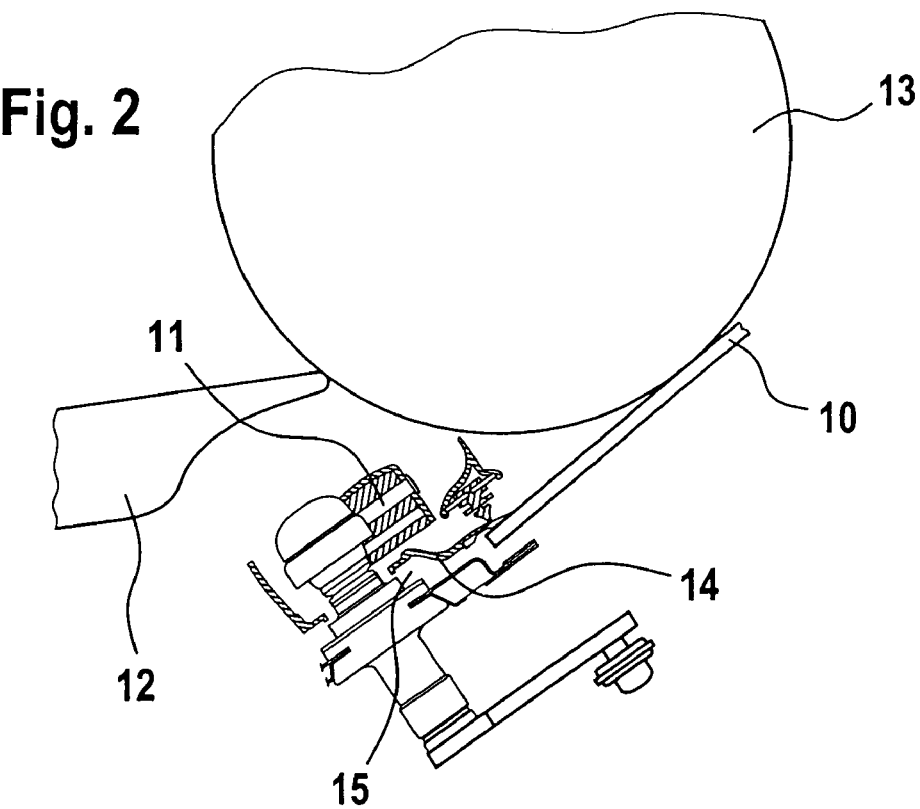

WINDSCREEN WIPER DEVICE

The invention relates to a windshield wiper device, in particular for a motor vehicle with at least one wiper arm and an engine hood that can be raised in the case of an impact.

FIG. 1 shows a windshield 10, a wiper arm 11 and an engine hood 12 after a collision with a pedestrian 13. In the least favorable case, the head of the pedestrian 13 impacts the hard windshield 10 and the projecting and sharp-edged wiper arm 11. The danger of severe injuries exists for the pedestrian 13 through an impact on the windshield 10 and in particular on the wiper arm 11. Because of future laws concerning pedestrian safety in an accident, an engine hood has been developed that raises in the case of an impact in the area of the windshield, thereby making an additional deformation path available. However, the wiper arm 11 can impair this additional deformation path because a collision between the raised engine hood and the wiper arm 11 is possible.

The objective of the invention is to improve a windshield wiper device of the type described at the outside so that the deformation path of an engine hood that is raised in the case of an impact is not impaired.

The invention attains the stated objective via a windshield wiper device, in particular for a motor vehicle, with at least one wiper arm and an engine hood that can be raised in the case of an impact, wherein the at least one wiper arm can be moved in the case of an impact into a position below a windshield or into a position in the area of a wiper field. As a result, the at least one wiper arm releases the additional deformation path in the case of an impact of the raised engine hood so that this deformation path can be used in an unhindered manner for the deformation of the engine hood. For this purpose, the at least one wiper arm is positioned below the windshield so that the engine hood can move beyond the at least one wiper arm positioned below the windshield, or the wiper arm is moved into the area of the wiper field, which lies outside the deformation path of the at least one wiper arm. If the at least one wiper arm is positioned below the windshield in the case of an impact, it not only guarantees an unhindered deformation path for the engine hood, but, in the case of an impact with a pedestrian, it also increases the protection for the pedestrian on the vehicle since said pedestrian can no longer be injured on the hard and relatively sharp-edged parts of the at least one wiper arm, in particular on the joint between the fastening part and the articulated part of the wiper arm.

If, in an impact, a wiper blade arranged on the at least one wiper arm is placed on a plastic covering provided below the windshield, the danger of injury to the pedestrian is also reduced since the plastic covering is relatively soft and therefore yielding.

If a free space is located beneath the plastic covering then the deformation of the plastic covering is possible in an unhindered manner so that the plastic covering can absorb the impact energy in an unhindered manner, thereby further reducing the risk of injury to the pedestrian.

In the case of an impact, a drive shaft of the at least one wiper arm can be rotated around a certain angle advantageously via automatic actuation of at least one wiper motor. As a result, the at least one wiper arm can be positioned in a simple and quick manner below the windshield or in the area of the wiper field.

In order to quickly position the at least one wiper arm in the case of an impact, a signal to raise the engine hood can also be used to position the at least one wiper arm. In doing so, the signal can be processed in the on-board electronics or in the electronics of the at least one wiper motor to trigger the at least one wiper motor.

So that a collision between the engine hood and the at least one wiper arm can be avoided, it is expedient if the raising of the engine hood and the positioning of the at least one wiper arm are coordinated with each other in terms of time. Therefore, the inertia of mass of the engine hood and the wiper arm as well as the to-be-traveled raising path of the engine hood and the movement distance for positioning the wiper arm must be taken into consideration. Raising the engine hood can therefore occur at the same time as or somewhat earlier than the movement of the wiper arm into the required position. However, both movements occur within a few milliseconds so that even an engine hood that is raised first appears to a outside observer to occur simultaneously with the positioning of the at least one wiper arm.

If the at least one wiper motor is a reversing motor or a wiper direct drive in which the wiper arm is fastened directly on the drive axle of the wiper motor, it is also possible to position the at least one wiper arm below the windshield. If the at least one wiper motor is a true-running motor without electronics, it is only possible to position the at least one wiper arm in the area of the wiper field.

So that quick positioning of the at least one wiper arm is especially easily possible, a motor crank and a coupling rod of a wiper linkage are located outside an extension position or covering position in the wiper arm's parking position.

It is advantageously possible for the positioning of the at least one wiper arm below the windshield to take place from a parking position in the area of the lower edge of the windshield. In addition or alternatively, the positioning of the at least one wiper arm can also take place from a parking position in the area of the A-pillars and/or during the wiper operation.

An exemplary embodiment of the windshield wiper device in accordance with the invention is explained in more detail in the following on the basis of the enclosed drawings.

The drawings show in detail:

FIG. 1 A side view of the lower area of a windshield, a wiper arm and an engine hood in accordance with the state of the art.

FIG. 2 A side view of the lower area of a windshield, a wiper arm and an engine hood in accordance with the invention.

FIG. 3 A block diagram for positioning a wiper arm via the on-board electronics.

Figure 4:
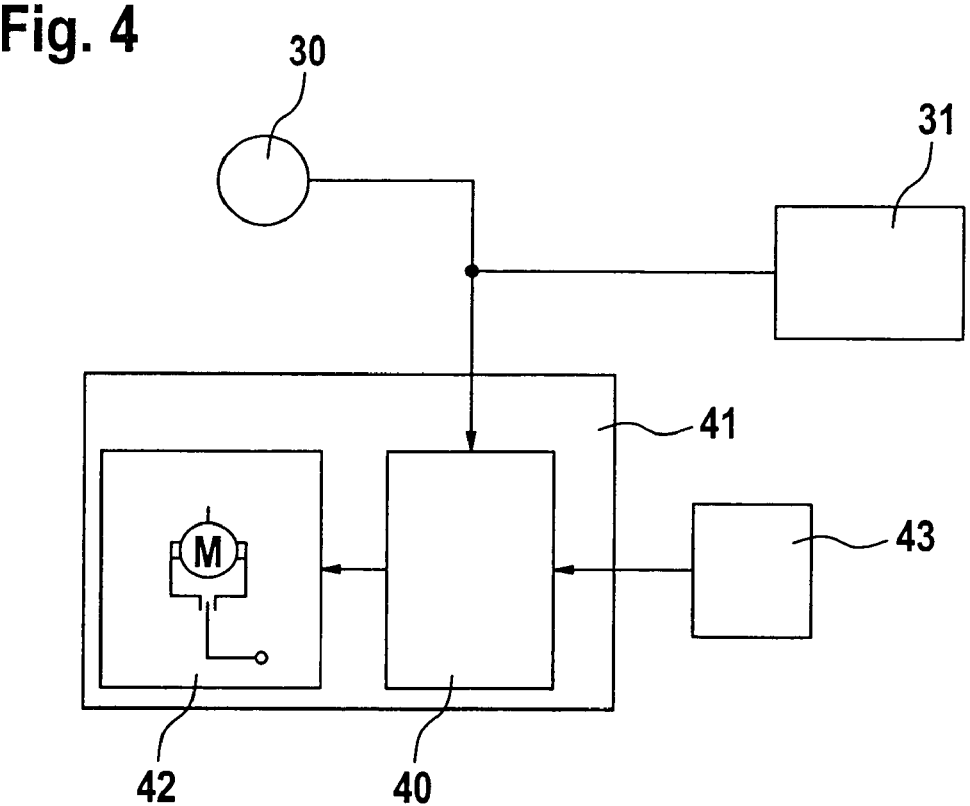

FIG. 4 A block diagram for positioning a wiper arm via the electronics in a wiper motor.

FIG. 2 shows a pedestrian 13 after a collision with a motor vehicle, whereby in the least favorable case, the pedestrian's 13 head impacts a windshield 10. Directly after the collision, an engine hood 12 is raised so that a wiper arm 11 can be positioned below the windshield 10. As a result, the pedestrian's 13 head touches the wiper arm 11 only very slightly or in the most favorable case not even at all. The wiper arm 11 lies on a plastic covering 14, which is relatively soft and easily deformable so that the plastic covering 14 can absorb any possible impact of the pedestrian 13 with the wiper arm 11. Beneath the plastic covering 14 is a free space 15, which offers the plastic covering 14 a sufficiently large clearance for deformation.

FIG. 3 shows a sensor 30, which can also be arranged together with several other such sensors on the engine hood of a motor vehicle. In the case of an impact, the sensor 30 sends a signal to an actuator 31 to raise the engine hood 12 and to the on-board electronics (not shown in greater detail in this case). The on-board electronics also actuates a wiper motor 32, which is preferably a reversing motor or a wiper direct drive, which positions the wiper arm 11 (see FIG. 2) preferably in a position below the windshield 10. In order to avoid a collision between the engine hood 12 and the wiper arm 11, the activation of the actuator 31 and the wiper motor 32 must be coordinated with one another in terms of time. Thus, the wiper motor 32 cannot be activated until raising the engine hood 12 has created enough space to prevent a collision between the wiper arm 11 and the engine hood 12 when positioning the wiper arm 11. In coordinating the actuator 31 and the wiper motor 32 in terms of time, the inertia of mass of both the engine hood 12 and the wiper arm 11, and the distances to be traveled to raise the engine hood 12 and to position the wiper arm 11 must be taken into consideration.

FIG. 4 shows the sensor 30, which relays its signal to the actuator 31 and to the electronics 40, which are accommodated in the housing 41 of a wiper motor 42. With this variation, it is possible therefore to dispense with the on-board electronics to activate the wiper motor 42. Instead, in the case of an impact, the electronics 40, which normally turn on the wiper motor 42 via a steering column switch 43, are used to position the wiper arm 11 (see FIG. 2).

The invention claimed is:

1. Windshield wiper device comprising:
    at least one wiper arm (11);
    at least one wiper motor (32, 42) operable, in the case of an impact, to position the wiper arm (11) into one of the position below a windshield (10) and the position in an area of a wiper field; and
    a sensor operable to detect an impact and to thereafter cause the at least one motor (32, 42) to automatically adjust the position of the at least wiper arm (11).

2. Windshield wiper device according to claim 1, characterized in that, in the case of an impact, a wiper blade attached on the at least one wiper arm (11) is positionable on a plastic covering (14) provided below the windshield (10).

3. Windshield wiper device according to claim 2, characterized in that a free space (15) is located beneath the plastic covering (14).

4. Windshield wiper device according to claim 2, characterized in that, in the case of an impact, a drive shaft of the at least one wiper arm (11) is rotatable around a certain angle via automatic actuation of at least one wiper motor (32, 42) to thereby position the at least one wiper arm (11).

5. Windshield wiper device according to claim 1, characterized in that, in the case of an impact, a drive shaft of the at least one wiper arm (11) is rotatable around a certain angle via automatic actuation of at least one wiper motor (32, 42) to thereby position the at least one wiper arm (11).

6. Windshield wiper device according to claim 5, characterized in that, in the case of an impact, a signal to raise the engine hood (12) causes the at least one wiper arm (11) to be positioned.

7. Windshield wiper device according to claim 1, characterized in that, in the case of an impact, a signal to raise the engine hood (12) causes the at least one wiper arm (11) to be positioned.

8. Windshield wiper device according to claim 7, characterized in that on-board electronics process the signal to trigger at least one wiper motor (32) to position the at least one wiper arm (11).

9. Windshield wiper device according to claim 8, characterized in that the at least one windshield wiper motor (32, 42) includes one of a reversing motor and a wiper direct drive.

10. Windshield wiper device according to claim 9, characterized in that the positioning of the at least one wiper arm (11) takes place at least one of from a parking position in the area of the lower edge of the windshield (10), from a parking position in the area of the A-pillars, and during wiper operation.

11. Windshield wiper device according to claim 7, characterized in that electronics (40) of at least one wiper motor (42) process the signal to trigger the at least one wiper motor (42) to position the at least one wiper arm (11).

12. Windshield wiper device according to claim 7, characterized in that, in the case of an impact, the raising of the engine hood (12) and the positioning of the at least one wiper arm (11) are coordinated in terms of time.

13. Windshield wiper device according to claim 12, characterized in that the at least one windshield wiper motor (32, 42) includes one of a reversing motor and a wiper direct drive.

14. Windshield wiper device according to claim 1, characterized in that the positioning of the at least one wiper arm (11) takes place at least one of from a parking position in the area of the lower edge of the windshield (10), from a parking position in the area of the A-pillars, and during wiper operation.

15. Windshield wiper device according to claim 1, characterized in that, in the parking position of the at least one wiper arm (11), a motor crank and a coupling rod of a wiper linkage are located outside at least one of an extension position and a covering position.

16. Windshield wiper device according to claim 15, characterized in that, in the parking position of the at least one wiper arm (11), a motor crank and a coupling rod of a wiper linkage are located outside at least one of an extension position and a covering position.

17. Windshield wiper device comprising:
    at least one wiper arm (11);
    at least one wiper motor (32, 42) operable, in the case of an impact, to position the wiper arm (11) into one of the position below a windshield (10) and the position in an area of a wiper field;
    a sensor operable to detect an impact and to output a signal; and
    electronics operable, in the case of an impact, to process the signal and to thereafter cause the at least one wiper motor (32, 42) to automatically position the at least one wiper arm (11).

18. Windshield wiper device for a motor vehicle including a hood (12), in the case of an impact, the hood (12) being raisable, the device comprising:
    at least one wiper arm (11);
    at least one wiper motor (32, 42) operable, in the case of an impact, to position the wiper arm (11) into one of the position below a windshield (10) and the position in an area of a wiper field;
    a sensor operable to detect an impact and to output a signal; and
    electronics operable, in the case of an impact, to process the signal to raise the hood (12) and to thereafter cause the at least one wiper motor (32, 42) to automatically position the at least one wiper arm (11).

* * * * *